United States Patent
Reed et al.

(10) Patent No.: US 7,520,750 B2
(45) Date of Patent: Apr. 21, 2009

(54) TRANSPORTABLE INTERACTIVE KIT

(76) Inventors: Jean Reed, 8038 Ripco Rd., Eagle River, WI (US) 54521; Bonnie Taylor, W. 1318 Redwood Dr., Seymour, WI (US) 54165; Kathryn Henn-Reinke, 6632 S. 120th Ct., Franklin, WI (US) 53132

( * ) Notice: Subject to any disclaimer, the term of this patent is extended or adjusted under 35 U.S.C. 154(b) by 665 days.

(21) Appl. No.: 11/005,600

(22) Filed: Dec. 6, 2004

(65) Prior Publication Data

US 2006/0119039 A1 Jun. 8, 2006

(51) Int. Cl.
*G09B 25/00* (2006.01)

(52) U.S. Cl. ...................................... 434/365

(58) Field of Classification Search ............... 434/81, 434/84, 85, 87, 247, 258–261, 365, 386, 434/408, 413, 414, 429
See application file for complete search history.

(56) References Cited

U.S. PATENT DOCUMENTS

| | | | | |
|---|---|---|---|---|
| 929,074 A | * | 7/1909 | Brown et al. ............... 190/16 |
| 2,299,673 A | * | 10/1942 | Zolkind ..................... 312/231 |
| 2,867,045 A | * | 1/1959 | Millgate .................... 434/426 |
| 2,971,277 A | * | 2/1961 | Vaillancourt ............... 434/417 |
| 3,414,987 A | * | 12/1968 | Lindenauer ................ 434/429 |
| 4,470,821 A | | 9/1984 | LeCapelain |
| 4,497,630 A | | 2/1985 | Oliver |
| 4,545,768 A | * | 10/1985 | Hinnen ...................... 434/304 |
| 4,828,502 A | * | 5/1989 | Leahy ........................ 434/416 |
| 5,087,203 A | | 2/1992 | James-Hymes |
| 5,115,893 A | * | 5/1992 | Terkildsen .................. 190/11 |
| 5,123,846 A | | 6/1992 | Lewis |
| 5,161,321 A | * | 11/1992 | Kuhnke ...................... 40/493 |
| 5,799,791 A | * | 9/1998 | Harley ....................... 206/478 |
| 5,979,620 A | * | 11/1999 | Lurie et al. ................ 190/16 |
| 6,126,012 A | * | 10/2000 | Roegner .................... 206/579 |
| 6,189,594 B1 | * | 2/2001 | Carter ....................... 160/135 |
| 6,371,288 B1 | * | 4/2002 | Licata ....................... 206/214 |
| 6,382,421 B1 | * | 5/2002 | Dao .......................... 206/575 |
| 6,449,460 B2 | | 9/2002 | Logan |
| 6,626,675 B1 | * | 9/2003 | Webber ..................... 434/156 |
| 6,981,593 B1 | * | 1/2006 | Klodt ........................ 206/541 |
| 7,040,899 B2 | * | 5/2006 | Armstrong ................. 434/430 |

* cited by examiner

*Primary Examiner*—Kurt Fernstrom
(74) *Attorney, Agent, or Firm*—McDermott Will & Emery LLP

(57) ABSTRACT

A transportable interactive learning and/or gaming kit is provided. Various embodiments of the interactive kits include a school kit and a camping kit. One embodiment of the kit includes a housing having a main body portion, a first exterior panel member, and an interactive surface on at least one wall associated with the main body portion or the first exterior panel member.

16 Claims, 3 Drawing Sheets

TRANSPORTABLE INTERACTIVE KIT

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates generally to an instructional and/or gaming apparatus, and more specifically to a transportable kit and method of utilizing same.

BACKGROUND OF THE INVENTION

Instructional kits and other gaming devices are well known in the art. Such kits are generally used to provide various resources to the user, such as instructional aids and gaming instruments, in a complete package. While such kits according to the prior art provide a number of advantageous features, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention generally provides a transportable interactive learning and/or gaming kit. One embodiment of the kit comprises a housing having a main body portion, a first exterior panel member, and an interactive surface on at least one wall associated with the main body portion or the first exterior panel member.

According to another embodiment, a first interior cavity is defined by the main body portion.

According to another embodiment, the main body portion comprises a first housing member hingedly connected to a second housing member. The first and second housing members encapsulate the first interior cavity in a first position. Further, a second interior cavity may be defined by the main body portion. Typically, the first interior cavity is provided within the first housing member, and the second interior cavity is provided within the second housing member.

According to another embodiment, the first exterior panel member is hingedly attached to the main body portion, and a first exterior cavity is defined between the first exterior panel member and the main body portion. In one embodiment, the first exterior panel member is hingedly attached to the first housing member.

According to another embodiment, a second exterior panel member is hingedly attached to the main body portion. In one embodiment, the second exterior panel member is positioned opposite the first exterior panel member, and is hingedly attached to the second housing member. A second exterior cavity is defined between the second exterior panel member and the main body portion.

According to another embodiment, at least one of the first interior cavity and the second interior cavity has a plurality of compartments adapted to hold a variety of supplies. Additionally, securing members may be provided and associated with at least one of the compartments to secure a supply within the compartment.

According to another embodiment, at least one of the first and second exterior cavities has a plurality of compartments adapted to hold a variety of supplies. Additionally, securing members may be associated with at least one of the compartments to secure a supply within the compartment.

According to another embodiment, the interactive surface is a surface capable of at least one of: (a) having writing indicia removably applied thereto; (b) carrying writing indicia; (c) being comprised of paper; (d) being comprised of a chalk board; (e) being comprised of a dry erase board; (f) being comprised of a magnetic board; and/or (g) being comprised of a game board. In one embodiment the interactive surface is on an interior wall of an exterior panel member, in another embodiment the interactive surface is on an exterior wall of the exterior panel member, and in another embodiment the interactive surface is on an exterior wall of the main body portion. Additionally, a second interactive surface may be provided.

According to another embodiment, a first fastener is provided for joining the first and second housing members and for closing the first interior cavity. Additionally, a second fastener may be provided for joining the exterior panel member to the main body portion for closing the first exterior cavity.

According to another yet embodiment, a support is provided to maintain the first exterior panel member in a position substantially perpendicular to the main body portion.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
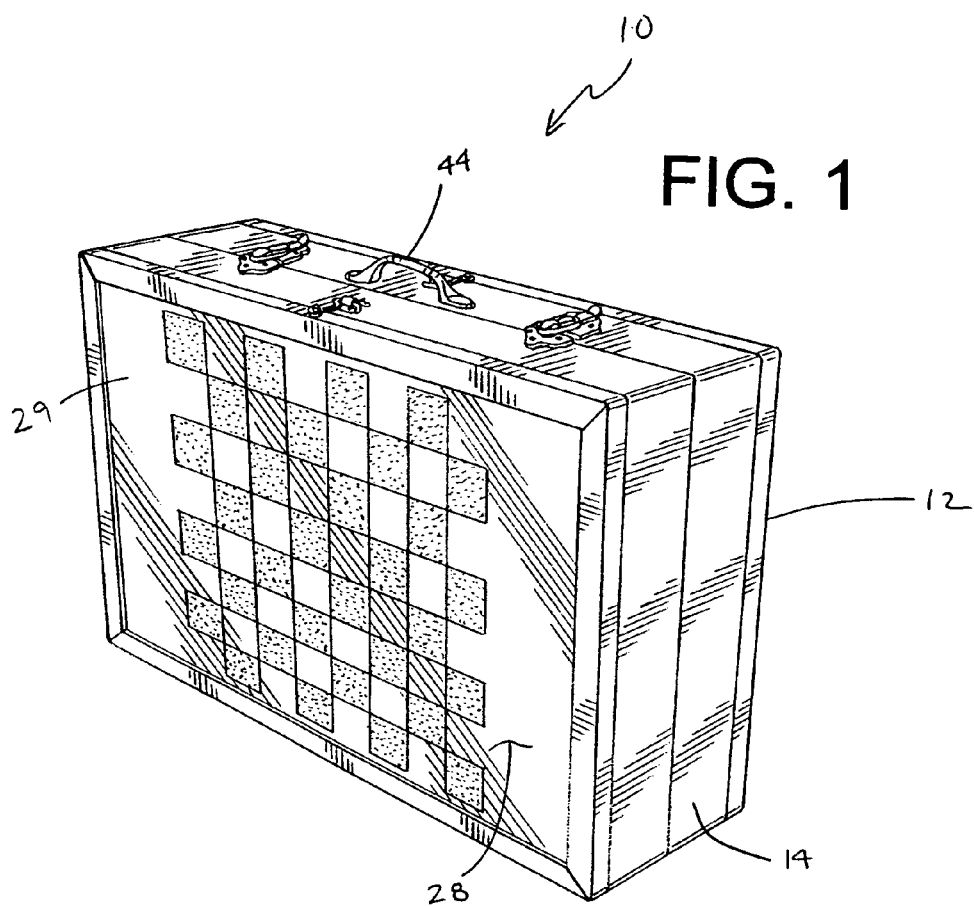
FIG. 1 is a perspective view of one embodiment of a learning kit apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
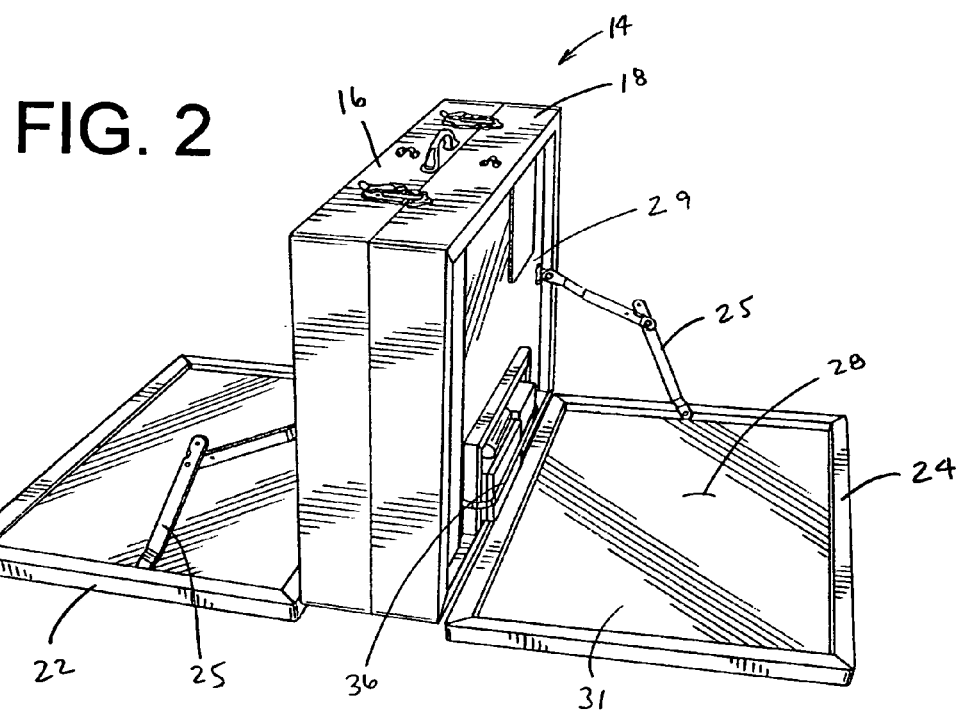
FIG. 2 is a perspective view of a learning kit apparatus with exterior panel members in an open position.
Figure 3:
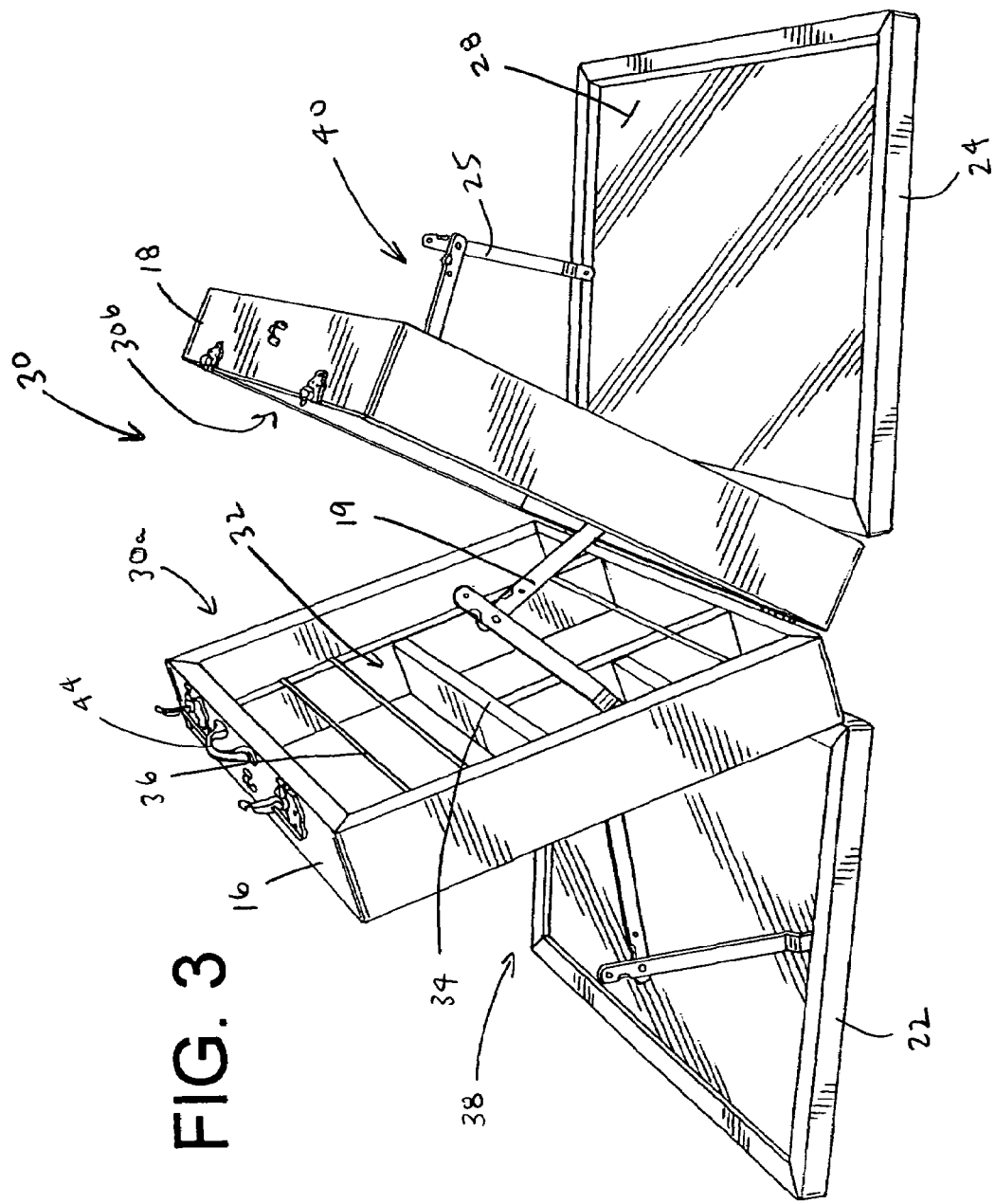
FIG. 3 is a perspective view of a learning kit apparatus with exterior panel members and housing members in partially open positions.

Referring now to the Figures, and specifically to FIGS. 1-3, there is shown a transportable learning kit 10. The learning kit 10 generally comprises a housing 12 having a main body portion 14. In a preferred embodiment, the main body portion 14 comprises a first housing member 16 and a second housing member 18. The housing 12 may be made of any material, such as plastic or wood. In a preferred embodiment, the housing 12 is approximately 14" wide, 20" long and 7" thick.

Figure 5:
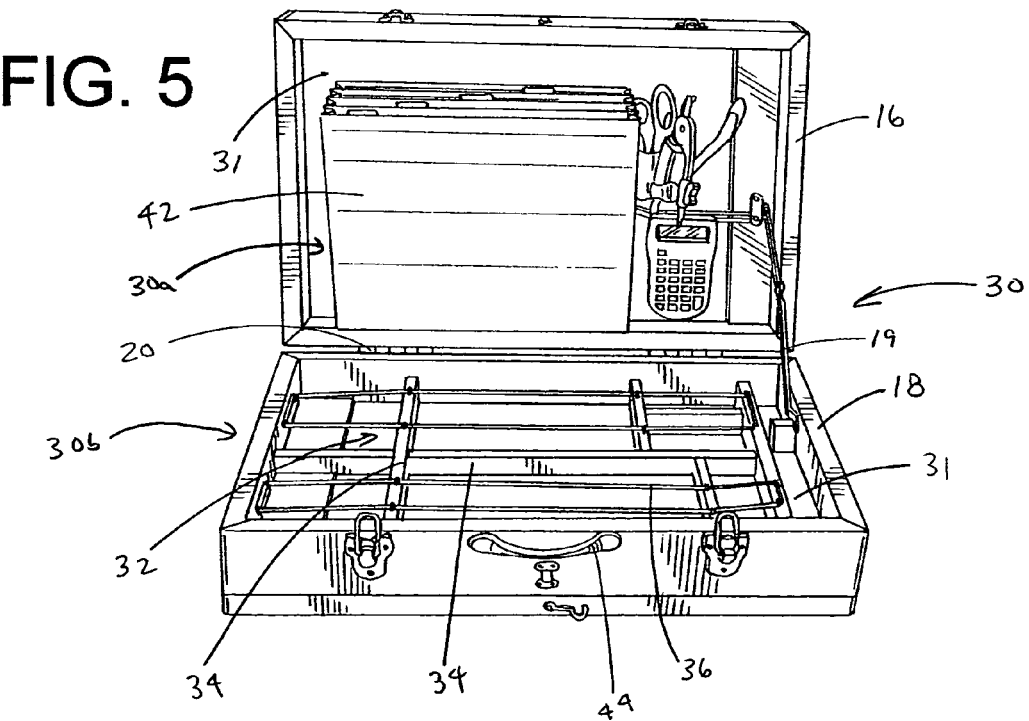

The first and second housing members 16, 18 are connected to one another at a hinge 20, as best shown in FIG. 5. The hinge 20 may be a living hinge. Because the first and second housing members 16, 18 are connected to one another at a hinge 20, they can move between a first position whereby they are closedly connected, such as that shown in FIGS. 1 and 2, and a second position whereby they are fully open, such as that shown in FIG. 5. Additionally, the first and second housing members 16, 18 can move to any position between the first and second positions, such as the position shown in FIG. 3.

A support 19 is connected between the first and second housing members 16, 18. The support 19 assists in preventing the first and second housing members 16, 18 from being opened beyond a desired position. Additionally, the support 19 assists in maintaining the first and second housing members 16, 18 in the second or open position, shown in FIG. 5. In the second position the first and second housing members 16, 18 are generally perpendicular, or at an angle of approximately 90°, to one another. The support 19 may comprise a hinge, such as a piano hinge.

As shown in FIGS. 1-3, a first fastener 21 is utilized to retain the first and second housing members 16, 18 in the first position. In one embodiment, the first fastener 21 is a clasp wherein a portion of the first fastener 21 is connected to the first housing member 16, and another portion of the first fastener 21 is joined the second housing member 18. Through manipulation of the first fastener 21 the portions thereof can be united and locked in position to closedly retain the first and second housing members 16, 18 together, and to close the first interior cavity 30 described below. It is understood by one of ordinary skill in the art that additional types of fasteners may be utilized, including fasteners internal to the first and second housing members 16, 18 to secure the first and second housing members 16, 18 in the first position, without departing from the spirit or scope of the present invention.

Figure 4:
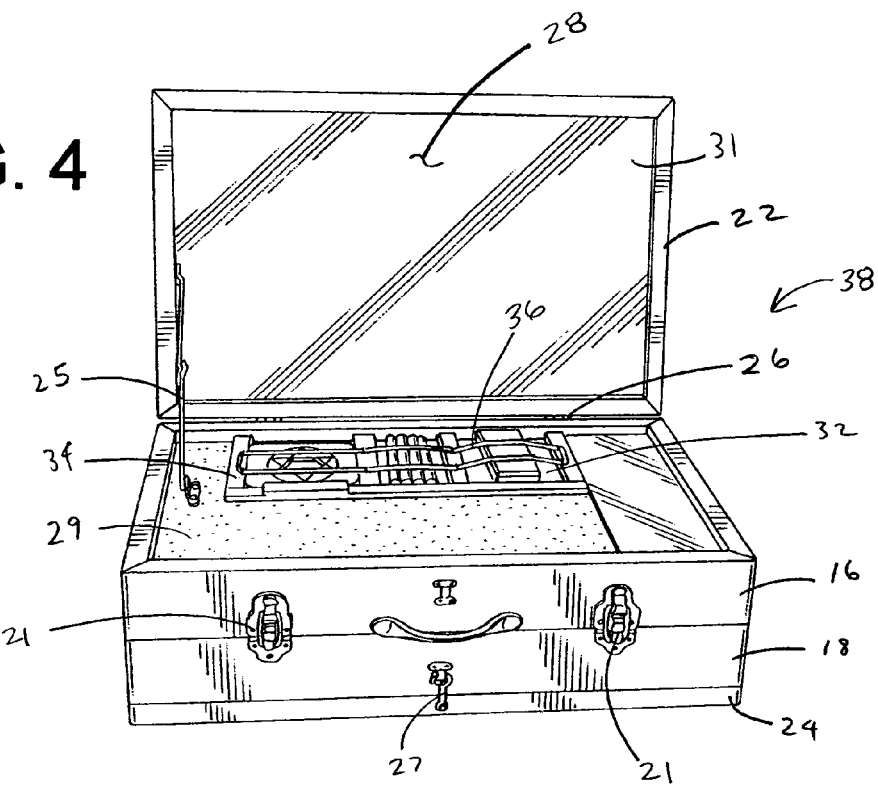
FIG. 4 is a perspective view of a learning kit apparatus with an exterior panel member in an open position; and, FIG. 5 is a perspective view of a learning kit apparatus with a housing member in an open position.

The learning kit 10 also comprises a first exterior panel member 22 hingedly connected or attached to the main body portion 14, and a second exterior panel member 24 hingedly connected or attached to the main body portion 14. In a preferred embodiment, the first exterior panel member 22 is hingedly connected to the first housing member 16 of the main body portion 14, and the second exterior panel member 24 is hingedly connected to the second housing member 18 of the main body portion 14. As shown in FIG. 4, the exterior panel members 22, 24 are connected to the first and second housing members 16, 18, respectively, with the use of hinges 26, which may include living hinges. In a preferred embodiment, two hinges 26 are utilized to connect the first exterior panel member 22 to the first housing member 16, and two hinges 26 are utilized to connect the second exterior panel member 24 to the second housing member 18. Because the first and second exterior panel members 22, 24 are connected to the first and second housing members 16, 18, respectively, with hinges 26, each exterior panel member 22, 24 can independently rotate between a first or closed position, and a second or open position.

The first or closed position of the exterior panel members 22, 24 is shown in FIG. 1. In that position the first exterior panel member 22 is in a closed or connected position with respect to the first housing member 16, and the second exterior panel member 24 is in a closed or connected position with respect to the second housing member 18. The second or open position of the exterior panel members 22, 24 is shown in FIGS. 2 and 4. Generally, in the second position the first exterior panel member 22 is in the open position with respect to the first housing member 16 and/or the second exterior panel member 24 is in the open position with respect to the second housing member 18. Referring to FIG. 2, both the first and second exterior panel members 22, 24 are in the second or open position, and referring to FIG. 4, the first exterior panel member 22 is in the second or open position and the second exterior panel member 24 is in the closed position.

Like the support 19 connecting the first and second housing members 16, 18, supports 25 are provided between the first exterior panel member 22 and the first housing member 16, and between the second exterior panel member 24 and the second housing member 18. The supports 25 are shown in FIGS. 2-4. The supports 25 assist in preventing the first and second exterior panel members 22, 24 from being opened beyond a desired position. Further, when the learning kit 10 is being utilized, as shown in FIG. 4, the supports 25 assist in maintaining the exterior panel members 22, 24 in the second position, which is approximately 90°, such that the exterior panel members 22, 24 may be utilized for writing, etc. In this position the exterior panel member 22, 24 is substantially perpendicular to the main body portion 14.

Additionally, second fasteners 27 are provided for retaining the exterior panel members 22, 24 in a closed position relative to the main body portion 14. Specifically, as shown in the figures, one second fastener 27 is utilized to retain the first exterior panel member 22 in the closed position with respect to the first housing member 16, and another second fastener 27 is utilized to retain the second exterior panel member 24 in the closed position with respect to the second housing member 18. Like the first fastener 21 described above, the second fasteners 27 can be manipulated to allow the exterior panel members 22, 24 to be selectively opened and/or locked. One type of fastener 21 is a hook connected to an eyelet.

As shown in the figures, the transportable learning kit 10 also has an interactive surface 28. The interactive surface 28 is generally a surface that a user can utilize to interact therewith. For example, in the embodiment of FIG. 1 the interactive surface 28 comprises a game board, such as a checker board; in the embodiment of FIG. 2 the interactive surface 28 comprises a dry erase board; in the embodiment of FIG. 4 the interactive surface comprises 28 a chalk board. It is understood by one of ordinary skill in the art that numerous other types of interactive surfaces may be utilized without departing from the scope of the present invention, including but not limited to felt boards, paper, magnetic boards, game boards, etc. Referring to the interactive surface 28 shown in FIGS. 2 and 4, and additional other embodiments not specifically shown, the interactive surface 28 is capable of having writing indicia removably applied thereto, such as with chalk or wipeable markers, and/or the interactive surface 28 is capable of carrying writing indicia.

In a preferred embodiment, the interactive surface 28 is provided on at least one wall or surface associated with the main body portion 14 or one of the exterior panel members 22, 24. Further, the interactive surface 28 may be provided on both exterior walls or surfaces 29 and interior walls or surfaces 31 of the first and second housing members 16, 18 and/or the exterior panel members 22, 24. As shown in FIG. 1, a game board interactive surface 28 is provided on an exterior wall of the first exterior panel 22. Additionally, referring to FIG. 4, a dry erase board interactive surface 28 is provided on an interior wall of the first exterior panel 22. Alternatively, the interactive surface 28 may be provided on an interior wall of either the first and second housing member 16, 18, or on an exterior wall of the first and second housing members 16, 18.

As shown in FIG. 5, the main body portion 14 of the learning kit 10 has an interior cavity 30. In one embodiment, shown in FIG. 3, the interior cavity 30 of the learning kit 10 is encapsulated and further defined by the first and second housing members 16, 18 when the first and second housing members 16, 18 are in the first position as defined above. When one of the first and second housing members 16, 18 is opened, however, the interior cavity 30 is accessible. The interior cavity 30 may be subdivided into a first interior cavity 30a adjacent the first housing member 16, and a second interior cavity 30b adjacent the second housing member 18.

The interior cavity 30 also has a plurality of compartments 32 defined therein. The compartments 32 are generally adapted to hold a variety of supplies therein. As shown in FIG. 5, the compartments 32 are defined by dividers 34 connected to either or both of the first and second housing members 16, 18. The dividers 34 can be located within either of the interior cavities 30a, 30b in a multitude of positions to vary the size, shape and number of compartments 32. Additionally, the compartments 32 generally have a securing or retaining member 36 associated therewith to assist in securing the supplies within the compartment 32. In a preferred embodiment, the securing member 36 is a resilient and/or elastic member that is able to stretch to retain a variety of shapes and sizes of supplies in the compartments 32.

Referring to FIGS. 2-4, the learning kit 10 also has a first exterior cavity 38 defined between the first exterior panel member 22 and the first housing member 16 of the main body portion 14, and a second exterior cavity 40 between the second exterior panel member 24 and the second housing member 18 of the main body portion 14. Like the interior cavities 30a, 30b the exterior cavities 38, 40 may also have a plurality of compartments 32 adapted to hold a variety of supplies (see FIG. 4), and securing or retaining members 36 to secure the supplies within the compartments 32. Additional components for securing supplies within the learning kit 10 are also possible. For example, the embodiment of FIG. 5 includes an expandable file 42 in the interior cavity 30 to hold papers or other supplies.

The interactive kit 10 also has a handle 44 to assist the user in transporting the kit 10. In one embodiment the handle 44 is connected to one of the first or second housing members 16, 18.

Various types of supplies may be positioned in the compartments 32 and other locations in/on the housing 12 of the interactive kit 10 to produce various kits. For example, one type of interactive kit 10 is a school kit. The school kit may include: a flag which is secured in an aperture in the housing 12; an expandable file 42 labeled with subject areas and adapted to hold lesson plans in the interior cavity 30 of the housing 12; a writing utensil holder; various writing and coloring utensils; a paper punch; a protractor; a calculator; toys for recess such as a ball and jacks, a jump rope and tops; a pencil box with crayons, pencils, glue, markers and colored pencils; flashcards; a ruler; a stapler; tape, paper clips, etc. Additionally, in this embodiment one of the interactive surfaces 28 on the exterior wall of one of the exterior panel members 22, 24 has a map thereon, and one of the interactive surfaces 28 on the interior wall of one of the exterior panel members 22, 24 has a chalk board 28 and compartments 32 for holding chalk and an eraser in the exterior cavity thereof. The opposing exterior panel member 22, 24 has a magnetic dry erase board 28 on the interior wall thereof, and an alphabet chart 28 on the exterior wall thereof, a variety of supplies, such as stencils, stickers, dry erase markers, erasers, and various games are retained in the exterior cavity 28, 40 thereof. As shown in the figures, compartments 32 may be provided in the interior cavity 30 of the kit 10, and depending from the first and/or second housing members 16, 18. The compartments 32 may also be provided in either of the exterior cavities 38, 40 and depending from the exterior of the first and second housing members 16, 18 or depending from the interior of the first and second exterior panel members 22, 24.

Another type of interactive kit 10 is a camping kit. The camping kit may include a checker board interactive surface 28 on an exterior wall of one of the exterior panel members 22, 24. Additionally, in a preferred embodiment of the camping kit the first exterior panel member 22 opens to reveal a chalk board interactive surface 28 on the interior surface of the first exterior panel member 22. The exterior surface of the first housing member 16 has a plurality of compartments 32 depending therefrom, for holding items such as a flag, scissors, a drawing table, a ruler, writing utensils, index cards, a writing tablet and a weather kit. The second exterior panel member 24 has a dry erase/magnetic board 28 on its interior surface. The magnetic board 28 is adapted to hold an outdoor camping scene with the use of magnets. Figurines and other items, such as a canoe, a paddle, animals, trees, etc., having magnets attached thereto can also be placed on the magnetic board 28. Various compartments 32 in the second exterior cavity 40 hold stencils, writing utensils, a folding board game, and a constellation chart. The interior cavity 30 retains nets for catching various animals, a built-in ventilated bug retention box, a treasure hunt game, a scavenger hunt game, a flashlight, a camera, a compass, etc.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying claims.

What is claimed is:

1. A transportable learning kit comprising:
a main body portion having a first end of a first housing member hingedly connected to a first end of a second housing member, the first and second housing members defining an interior cavity and the first and second housing members encapsulating the interior cavity in a first position;
a first support having a first end connected to the first housing member a distance from the first end of the first housing member, and a second end connected to the second housing member a distance from the first end of the second housing member, the first support adapted to maintain the first housing member in a second position substantially perpendicular to the second housing member;

a first exterior panel member hingedly attached to the first end of the first housing member;

a second support having a first end connected to the first housing member a distance from the first end of the first housing member, and a second end connected to the first exterior panel member a distance from the first end of the first exterior panel member, the second support adapted to maintain the first exterior panel member in a second position substantially perpendicular to the first housing member;

a first exterior cavity being defined between the first exterior panel member and the first housing member; and, an interactive surface on one wall associated with the main body portion and an interactive writing surface on an exterior surface of the first exterior panel member, the interactive writing surface on the exterior surface of the first exterior panel member comprising one of a game board or an educational board.

2. The transportable learning kit of claim 1, further comprising a second exterior panel member hingedly attached to the first end of the second housing member, a second exterior cavity being defined between the second exterior panel member and the second housing member.

3. The transportable learning kit of claim 1, wherein the interior cavity has a plurality of compartments adapted to hold a variety of supplies.

4. The transportable learning kit of claim 3, further comprising a securing member associated with one of the compartments to secure the supply within the compartment.

5. The transportable learning kit of claim 1, wherein the first exterior cavity has a plurality of compartments adapted to hold a variety of supplies.

6. The transportable learning kit of claim 5, further comprising a securing member associated with one of the compartments to secure the supply within the compartment.

7. The transportable learning kit of claim 1, wherein the interactive surface is a surface capable of having writing indicia removably applied thereto.

8. The transportable learning kit of claim 1, wherein the interactive surface is a surface capable of carrying writing indicia.

9. The transportable learning kit of claim 8, wherein the interactive surface is paper.

10. The transportable learning kit of claim 1, wherein the main body portion comprises a first housing member hingedly connected to a second housing member, the first and second housing members encapsulating the interior cavity, at least one of the first and second housing members having a plurality of compartments adapted to hold supplies, and a first fastener for joining the first and second housing members and for closing the interior cavity.

11. The transportable learning kit of claim 10, further comprising a second fastener for joining the exterior panel member to the main body portion for closing the first exterior cavity.

12. The transportable learning kit of claim 1, wherein the interactive surface is on an interior wall of the first exterior panel member.

13. The transportable learning kit of claim 10, wherein the at least one of the plurality of compartments has a securing member for securing the supply within the compartment.

14. The transportable learning kit of claim 1, further comprising an expandable file attached in one of the interior cavity or the first exterior cavity.

15. A transportable interactive kit, comprising:

a housing having a first end of a first housing member hingedly connected to a first end of a second housing member to define a first interior cavity therebetween, a first end of a first exterior panel member hingedly attached to the first end of the first housing member to define a first exterior cavity between the first exterior panel member and the first housing member, a first support having a first end connected to the first housing member a distance from the first end of the first housing member and a second end connected to the first exterior panel member a distance from the first end of the first exterior panel member, the first support adapted to maintain the first exterior panel member in a position substantially perpendicular to the first housing member as desired, a second exterior panel member hingedly attached to the second housing member, a second support having a first end connected to the second housing member a distance from the first end of the second housing member and a second end connected to the second exterior panel member a distance from the first end of the second exterior panel member, the second support adapted to maintain the second exterior panel member in a position substantially perpendicular to the second housing member as desired, and a second exterior cavity being defined between the second exterior panel member and the second housing member, wherein the first exterior panel member has an interior surface and an exterior surface and at least one of the interior surface and the exterior surface of the first exterior panel member defines an interactive surface, wherein the first interior cavity has a plurality of compartments adapted to hold a variety of supplies, and a retaining member associated with the compartments to assist in retaining the supplies in the compartments.

16. The transportable interactive kit of claim 15, further comprising a first fastener for joining the first and second housing members and for closing the first interior cavity, and a second fastener for joining the first exterior panel member to the first housing member for closing the first exterior cavity.

* * * * *